United States Patent
Haehl et al.

(10) Patent No.: US 10,302,205 B2
(45) Date of Patent: May 28, 2019

(54) HYDRAULIC COMPONENT WITH A VALVE UNIT AND HYDRAULIC SYSTEM WITH A HYDRAULIC COMPONENT

(71) Applicant: HAWE HYDRAULIK SE, Munich (DE)

(72) Inventors: Alexander Haehl, Munich (DE); Johannes Glaser, Munich (DE); Alexander Haas, Walpertskirchen (DE); Engelbert Zwingler, Antholing (DE)

(73) Assignee: HAWE HYDRAULIK SE, Munich (DE)

( * ) Notice: Subject to any disclaimer, the term of this patent is extended or adjusted under 35 U.S.C. 154(b) by 0 days.

(21) Appl. No.: 15/788,172

(22) Filed: Oct. 19, 2017

(65) Prior Publication Data
US 2019/0011053 A1    Jan. 10, 2019

(30) Foreign Application Priority Data
Jul. 4, 2017  (DE) .................. 10 2017 211 403

(51) Int. Cl.
*F16K 5/04*    (2006.01)

(52) U.S. Cl.
CPC .............. *F16K 5/0471* (2013.01); *F16K 5/04* (2013.01); *Y10T 137/5762* (2015.04)

(58) Field of Classification Search
CPC ..... F16K 5/0471; F16K 5/04; Y10T 137/5762
USPC ......................................... 137/312
See application file for complete search history.

(56) References Cited

U.S. PATENT DOCUMENTS

| | | | |
|---|---|---|---|
| 6,393,839 B1 | 5/2002 | Agner | |
| 6,725,876 B2* | 4/2004 | Bowman et al. | F02C 7/232 |
| | | | 137/312 |
| 2003/0127135 A1* | 7/2003 | Gremillion et al. | B01J 4/02 |
| | | | 137/312 |

(Continued)

FOREIGN PATENT DOCUMENTS

| | | |
|---|---|---|
| DE | 2 248 486 A1 | 4/1974 |
| DE | 199 52 144 A1 | 8/2000 |
| DE | 10 2014 212 324 A1 | 12/2015 |

OTHER PUBLICATIONS

German Examination Report dated Mar. 5, 2018, Application No. 10 2017 211 403.7, Applicant HAWE Hydraulik SE, 7 Pages.

*Primary Examiner* — Kevin L Lee
(74) *Attorney, Agent, or Firm* — Brooks Kushman P.C.

(57) ABSTRACT

The present disclosure relates to a hydraulic component with a valve unit for a hydraulic system, and a hydraulic system having such a hydraulic component. The valve unit of the hydraulic component has a valve block and a valve piston. The valve piston is moveably along a first bore supported in the valve block. Further, the valve unit is admittable with pressurized hydraulic fluid and is configured such that the valve piston can be moved between a closed position and an open position. The hydraulic component according to the disclosure is particularly characterized in that the first bore is configured as a through-hole through the entire valve block and the hydraulic component has a collecting unit. The collecting unit at least partially surrounds the two end openings of the first bore and is configured collect and drain hydraulic fluid leaking out of the two end openings of the bore.

20 Claims, 1 Drawing Sheet

(56) References Cited

U.S. PATENT DOCUMENTS

2015/0246806 A1\* 9/2015 Yoo et al. ............ B67D 7/3209
137/312

\* cited by examiner

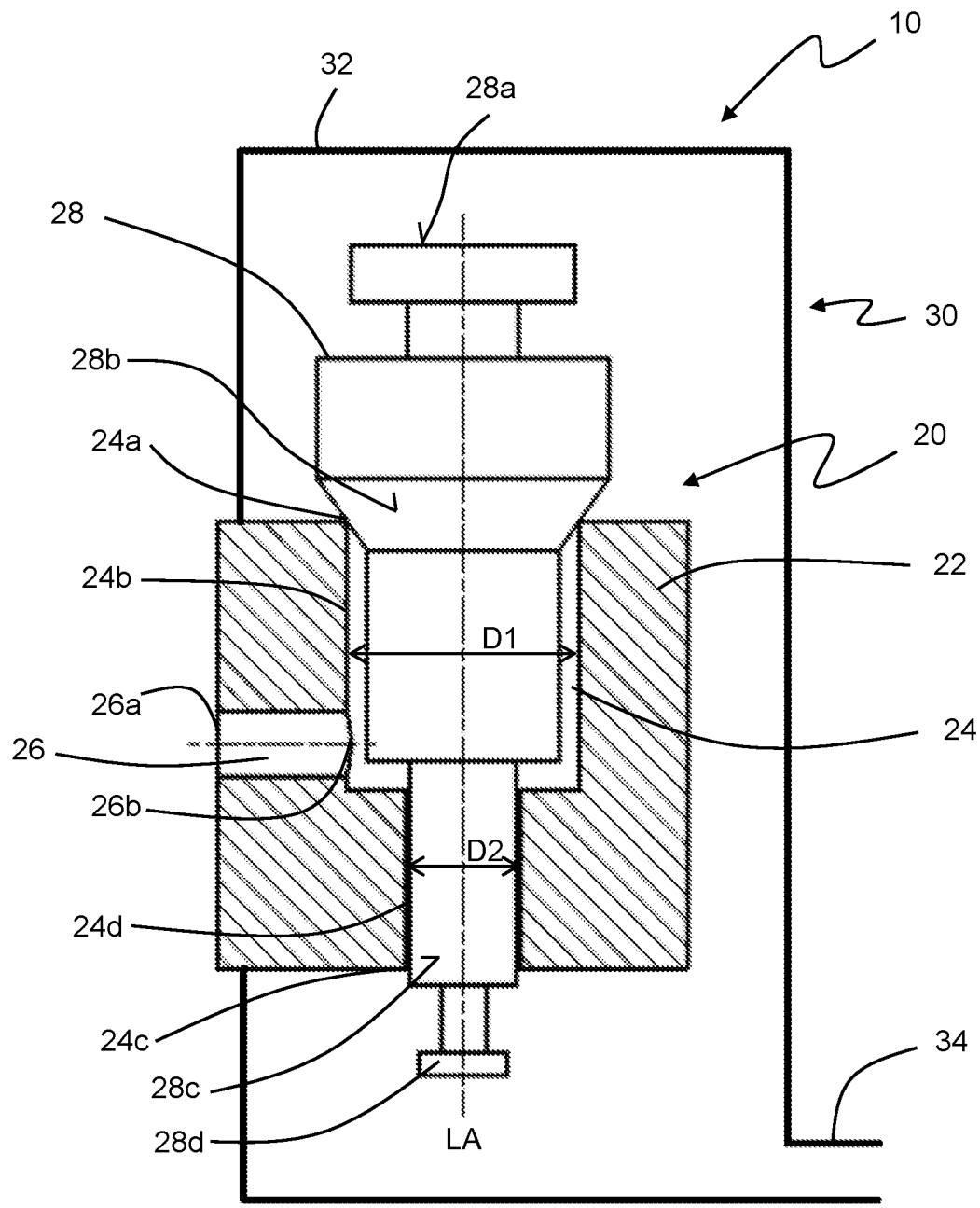

HYDRAULIC COMPONENT WITH A VALVE UNIT AND HYDRAULIC SYSTEM WITH A HYDRAULIC COMPONENT

CROSS-REFERENCE TO RELATED APPLICATIONS

This application claims foreign priority benefits under 35 U.S.C. § 119(a)-(d) to German patent application number DE 10 2017 211 403.7, filed Jul. 4, 2017, which is incorporated by reference in its entirety.

TECHNICAL FIELD

The present disclosure relates to a hydraulic component with a valve unit for a hydraulic system and a hydraulic system with such a hydraulic component.

BACKGROUND

Traditional hydraulic components with a valve unit for a hydraulic system regularly have a valve block and a valve piston. Here, the valve piston is moveably supported and guided respectively along a first bore in the valve block. The valve unit can regularly be admitted with pressurized hydraulic fluid via a corresponding port or pressure lines and is configured such that the valve piston is movable between a closed position and an open position.

Here, particularly when the valve unit is configured as a seated valve the bore is regularly formed as a blind hole in order to avoid the provision of unnecessary sealing elements. The disadvantage of this is the production process, as tight tolerances have to be maintained especially for the inner circumference of the bore. Thus, also configurations are known in which the bore first is formed continuously, wherein in this case corresponding sealing elements have to be provided or the bore is closed by a plug or the like later.

However, such sealing elements regularly result in hysteresis effects when opening and closing the valve unit. Here, such hysteresis effects may be undesired in particular with a pressure-dependent control of the valve unit, since they can displace the shifting point of the valve unit. On the other hand, the properties of the hysteresis change caused by the sealing elements can substantially change with an increasing wear of the sealing elements, what in particular with a very accurate control of the valve unit can lead to problems in that the shifting operation either is too late or too early.

Moreover, with the corresponding valve units there regularly result leakages through the end openings of the bore. These can hardly be avoided even by employing sealing elements, since the sealing properties of the sealing elements deteriorate with their wear, wherein with an increasing age of the sealing elements increased leakage effects occur. Such leakages regularly result in a contamination of members that are provided in the region of the hydraulic component with hydraulic fluid. Further, the leakage results in an undesired consumption of hydraulic fluid. Accordingly, it is required to clean the corresponding members, to replace or renew, respectively, sealing elements of the valve unit, and to refill hydraulic fluid in the hydraulic system. All of this is associated i.e., with a high time and cost expenditure and must be avoided.

SUMMARY

Therefore, it is an object of the present disclosure to provide a hydraulic component with a valve unit as well as a corresponding hydraulic system in which the above-mentioned undesired effects can largely be suppressed or even completely avoided.

The hydraulic component with valve unit for a hydraulic system according to the disclosure over the conventional hydraulic components is characterized in that the first bore is configured as a through-hole through the entire valve block and the hydraulic component has a collecting unit. The collecting unit at least partially surrounds the two end openings of the first bore and is configured to collect and drain hydraulic fluid leaking out of the two end openings of the bore.

Here, the term "surround" is to be understood in the meaning of encompassing or jacketing and especially as sealing leakage-free regarding the valve block. In this way, the collecting unit generally should be configured to safely collect all the hydraulic fluid leaking out of the two end openings. By "drain" is meant for example supplying into a feedback to the tank of the corresponding hydraulic system. For that, the collecting unit can also have a corresponding port for coupling to a provided feedback of the hydraulic system.

Forming the bore as a through-hole regularly has the advantage of a more simple production process. While with blind holes inevitably dead spaces at the base of the blind hole occur that result from the necessary shape of the drill, with through-holes such dead spaces can be avoided. In this way, also problems caused by corresponding dead spaces such as deposits or undesired pressures can safely be avoided therein.

While in conventional systems with such a through-hole there is a regular need to provide corresponding sealing elements to avoid leakage at the end openings of the bore it is possible according to the disclosure to refrain from corresponding sealing elements. This is due to the fact that even if a corresponding leakage through one or both of the end openings of the first bore should occur the leaking hydraulic fluid is safely collected and drained by the provided collecting unit. In this way, the hydraulic fluid leaking out of the valve unit stays within the hydraulic system and can easily be fed back into the intended hydraulic circuit. By the possible renunciation of corresponding sealing elements maintenance requirements for the hydraulic component can significantly be reduced, what especially saves costs. Moreover, hysteresis effects in the control of the valve unit that are caused by sealing elements and, if there is any doubt, even depend on a wear of the corresponding sealing elements can be avoided. This allows a more accurate and reliable control of the valve unit and thus, of the hydraulic component than is possible for conventional systems.

Preferably, the valve unit has a pressure line formed as a second bore. Further, the first bore has at least two portions, a first portion of which extends from the first end opening of the first bore toward the second end opening of the first bore, while the second portion extends from the second end opening of the first bore toward the first end opening of the first bore. Here, the second bore leads to the first or to the second portion of the first bore. By providing the second bore the valve unit according to the disclosure can very easily be admitted with pressurized hydraulic fluid. Especially, here the pressure line formed as a second bore includes a corresponding port to be coupled to other elements of a hydraulic system to be formed. Dividing the first bore into two different portions each extending from one of the corresponding end openings of the first bore makes it possible to make the configuration of the first bore particularly variable and to adapt it to prevailing requirements without unnecessarily complicating the structure. Since the first bore is formed as a through-hole each of both portions of the first bore can largely independent of the other portion be milled or drilled into the valve block starting in front of the correspondingly provided end opening of the first bore. This allows a particularly simple formation of the first bore.

According to a particularly advantageous configuration the inner diameter of the first bore in the first portion is greater than the inner diameter in the second portion of the first bore. By the varying inner diameter of the first bore both a simple structural and functional division of the first bore into both portions is possible. For example, the wider of the two portions can be provided as the main flow path for hydraulic fluid through the valve unit, while the narrower of the two portions is only provided as a passageway for a functional element contacting the valve piston. Moreover, the interface between the two portions can act as an abutment for the valve piston and thus, safely restrict the movement of the valve piston.

Preferably, the valve piston has a sliding-contact area that regarding its dimensions, and particularly with respect to its outer diameter, is accurately fittingly adapted to the second portion of the first bore. Here, the sliding-contact area is configured to slide along the second portion of the first bore during a movement of the valve piston between the closed position and the open position of the valve unit. Here, accurately fitting is to be understood such that the outer diameter of the valve piston in its sliding-contact area is as close to the inner diameter of the first bore in the second portion as can cost-effectively be achieved, while extensively reducing the leakage, which is to be expected, between the valve piston and the valve block, without increasing the accompanied friction between the valve piston and the valve block beyond an acceptable level. With this configuration, at least the second end opening of the first bore is substantially closed by the valve piston. In this way, a flow of hydraulic fluid out of the second end opening of the first bore that goes beyond the leakage to be expected is avoided. Here, it is still possible to influence the valve piston by means of the second end opening of the first bore, for example via a functional element that is attached to the respective side of the valve piston. Finally, in this way the functionality of the obtained valve unit and thus, of the hydraulic component can significantly be increased without allowing undesired flows of hydraulic fluid through the second end opening of the first bore.

Here, it is particularly suitable if the second portion of the first bore and the sliding-contact area of the valve piston are formed without a seal. Here, without a seal is to be understood such that there are not provided any further or additional sealing elements, such as for example sealing rings. By refraining from the further sealing elements appropriate hysteresis effects as well as the need for a regular maintenance of the corresponding sealing elements can be avoided. Further, a wear-related variation of the valve properties can substantially be suppressed, because it is refrained from the particularly wear-sensitive sealing elements.

It is also of advantage if the collecting unit has a container and the second bore has a pressure line port. Here, the valve unit at least partially is arranged within the container, wherein at least the pressure line port is outside of the container. Via the pressure line port the valve unit very easily can be connected to further elements of a hydraulic system to be formed and admitted with pressurized hydraulic fluid. With the collecting unit having such a container that is especially configured to collect the hydraulic fluid leaking out of the two end openings of the bores, a particularly simple structural and functional configuration of the collecting unit is realized. It is conceivable that this container at the same time at least partially serves as a tank of the hydraulic system to be formed and/or is formed as part of a feedback of the corresponding hydraulic system. This represents a particularly simple, functional, cost-effective, and also reliable configuration.

It is of particular advantage if the collecting unit is configured to collect and drain hydraulic fluid that leaks out between the outer wall of the valve piston and the inner wall of the bore. In this way, it is possible to completely refrain from further sealing elements designed to suppress a leakage between the outer wall of the valve piston and the inner wall of the bore. This in particular is due to the fact that hydraulic fluid escaping or leaking out is already safely collected by the collecting unit and can be returned to the hydraulic circuit of the hydraulic system to be formed. In this way, with respect to the entire hydraulic system or the hydraulic component, respectively, there can no longer be talk of a leakage in the true sense of the word, since no hydraulic fluid leaves the hydraulic system.

Preferably, the axial length of the valve piston at least corresponds to the axial length of the first bore. Moreover, contact points that are configured such that functional elements can be coupled thereto, are provided at both axial ends of the valve piston. In this way, different areas can be provided along the valve piston that realize different functions and thus, significantly increase the functionality of the valve unit. If the axial length of the valve piston just corresponds to the axial length of the first bore there arises the possibility to provide at least one position of the valve piston in which the two end portions of the valve piston at the same time end with the outer surfaces of the valve block and thus, the valve unit takes a particularly space-saving position. If the axial length of the valve piston is greater than the axial length of the first bore, several positions of the valve piston can be realized in which the first bore is occupied by the valve piston along its entire length. In this way, it is possible to provide further functional areas in the valve piston, which in particular can extend over the entire length of the bore. As a result, the functionality of the obtained valve unit can be enhanced further. Moreover, a valve piston projecting from the first bore enables easier access to the valve piston and thus, the possibility to attach corresponding functional elements to the valve piston in a particularly easy way. Finally, a variety of functional elements can be coupled to the valve piston via the correspondingly provided contact points so as to adapt and extend the functionality of the valve unit and thus, of the entire hydraulic component in a number of ways.

Here, particularly at at least one of the provided contact points of the valve piston a functional element is provided. For example, the functional element can be configured to restrict a movement of the valve piston by being configured as an abutment for the valve piston. Further, the functional element can be configured in the form of a manually operable lever, for example to cause a movement of the valve piston. Further, the functional element can also be configured to bias the valve piston, for example in the form of a mechanical spring, toward the closed position or toward the open position of the valve piston. Here, particularly the force and/or the direction of the bias can be freely adjusted, what significantly enhances the functionality of the corresponding functional element. Finally, the functional element for example can also be configured to determine a state of motion of the valve piston by being configured as a sensor or representing a scanner for an external sensor, for example.

Here, a state of motion among others is to be understood as a current position of the valve piston and/or a speed or direction of movement, respectively, of the valve piston. These examples are only a few of suitable configurations of a corresponding functional element that on the one hand can easily be implemented and on the other hand cause a significantly improved functionality of the obtained hydraulic component.

Further, the valve unit can be configured as a seated valve, while the valve block in the area of at least one of the two end openings of the first bore has a corresponding valve seat. Especially, then the valve piston has at least one area that serves as a closing area or closing element, respectively. Regularly, the valve piston is biased via a corresponding biasing element such that the closing area is biased toward the valve seat and in a state of rest of the valve unit rests on the valve seat, whereby the valve unit is in a closed position. Seated valves have the advantage to enable a leakage-free ending of the valve unit, while both an opening operation and a closing operation can be performed very quickly and safe. This enables a precise and reliable control of the valve unit.

Further, the present disclosure relates to a hydraulic system having the above-described hydraulic component. In this way, the above-described advantages of the corresponding hydraulic components can also be applied to the hydraulic system according to the disclosure.

Advantageously, here the collecting unit at least partially is configured as a tank of the hydraulic system. In this way, by reducing the total number of the elements forming the hydraulic system, it is possible to considerably simplify the structure of the entire hydraulic system without limiting its functionality.

In the following, a particularly advantageous configuration of the present disclosure is described with reference to the attached drawing.

DESCRIPTION OF THE DRAWINGS

THE FIGURE shows a sectional view of a first embodiment of a hydraulic component according to the disclosure.

DETAILED DESCRIPTION

As shown in the FIGURE, the hydraulic component 10 here shown as an example has a valve unit 20 and a collecting unit 30. The valve unit 20 is made up of a valve block 22 in which a first bore 24 and a second bore 26 are provided. The first bore 24 is configured as a through-hole and has a first end opening 24a and a second end opening 24c. A first portion 24b of the first bore 24 extends from the first end opening 24a, while a second portion 24d of the first bore 24a extends from the second end opening 24c.

Here, the inner diameter D1 of the first bore in the first portion 24b is greater than the inner diameter D2 of the first bore 24 in the second portion 24d. The second bore 26 at a first end opening 26a is configured to be coupled to a further hydraulic component, for example to a hydraulic cylinder (not shown). In particular, the second bore 26 has a pressure line port at its first end opening 26a. The second bore 26 has a second end opening 26b at its end opposite to the first end opening 26a that leads to the first portion 24b of the first bore 24.

Further, a valve piston 28 moveably supported along the first bore is provided. Here, the valve piston 28 is divided into several areas. Two areas of the valve piston 28 are configured as coupling areas 28a, 28d and serve as contact points 28a, 28d for functional elements (not shown). In the present case, for example a mechanical spring (not shown) that is configured to apply a force to the valve piston 28 toward a closed position (downward in the FIGURE) acts on the first contact point 28a. For example, a manually operable control lever (not shown) is attached to the second contact point 28d of the valve piston 28. The control lever is configured to move the valve piston against the force of the mechanical spring to the open position (upward ink the FIGURE) to open the valve unit 20 and to enable a manually controlled drainage of hydraulic fluid. In addition to the two coupling areas 28a, 28d the valve piston 28 further comprises a closing area 28b that is configured to act as a closing element of the valve unit 20 and in the closed position of the valve piston 28 to rest on the edge of the first end opening 24a of the first bore 24 to close the valve unit 20. Therefore, the first end opening 24a forms a valve seat.

Furthermore, the valve piston 28 has a sliding-contact area 28c that is accurately fittingly adapted to the second portion 24d of the first bore 24 and can be moved between the open position and the closed position of the valve piston 28 along the second portion 24d of the first bore 24. As shown, the two coupling areas 28a and 28d each represent the end of the valve piston 28 along its longitudinal axis LA, while the closing area 28b and the sliding-contact area 28c are provided in corresponding portions of the valve piston 28. The collecting unit 30 has a container 32 that surrounds the majority of the valve block 22 and particularly the two end openings 24a, 24c of the first bore 24. The container 32 is configured to collect hydraulic fluid that leaks out past the valve piston 22 through one of the two end openings 24a, 24c and to lead it to an outlet 34.

The outlet 34 is connected to a feedback of a hydraulic system that is not explained in detail. Alternatively, the container 32 can also act as a tank of a corresponding hydraulic system, so that the outlet 34 is configured as a supply line to a pump of the hydraulic system. The hydraulic fluid leaking out of the valve block 22 is to be understood as substantially all, even the smallest flows of hydraulic fluid that leak out of the valve unit 20 into the container 32 between the valve piston 28 and the first bore 24. This includes both various leakage flows and intended draining flows that are formed in the open position of the valve piston 28.

In the present case, the hydraulic component with a valve unit is substantially configured as a hydraulic component with a pressure relief valve. The functionality is as follows.

If the hydraulic component 10 is used in building a corresponding hydraulic system, pressurized hydraulic fluid can flow into the first bore 24 and especially its first portion 24b via the second bore 26 as a pressure line. A pressure developing in the hydraulic fluid in the first bore 24 counteracts the spring force of the mechanical spring (upward ink the FIGURE) and in case of sufficient pressure lifts up the valve piston 28 and especially the closing area 28b of the valve piston 28 from the edge of the first end opening 24a that acts as a valve seat. In this way, with the appropriate pressure in the first bore 24 pressurized hydraulic fluid can drain off into the container 32 of the collecting unit 30 and finally be recycled to the not shown tank of the hydraulic system via the outlet 34, for example. By the accurately fitting adaption of the sliding-contact area 28c of the valve piston 28 to the second portion 24d of the first bore 24 a leakage out of the first bore through the second end opening 24c is minimized, but not completely eliminated. However, pressurized hydraulic fluid that accordingly also leaks out of the valve unit 20 between the valve piston 28 and the valve block 22 in the closed state of the valve unit 20 is also collected by the container 32 and thus, by the collecting unit 30 and so, can be fed back to the tank through the outlet 34.

If the hydraulic pressure in the first bore 24 is not sufficient to overcome the force of the mechanical spring and an opening of the valve unit 20 should be desired, it is possible to act on the valve piston 28 with the appropriate force via the manually operable control lever acting on the second contact point 28d so as to cause a manual opening of the valve unit 20 against the spring force. In this way, it is easy to implement an emergency drain for the hydraulic fluid.

The hydraulic pressure required to open the pressure relief valve 20 particularly depends on the properties of the mechanical spring 28 acting on the first contact point, its bias as well as a ratio of the two inner diameters of the first bore 24 in their two portions 24b and 24d and is freely adjustable via these.

As an alternative to the control lever acting on the second contact point 28d for example also a compression spring to be manually biased could be provided with which an opening pressure of the pressure-limiting valve 20 can be adjusted. Further, also sensors on one or both contact points 28a and 28d would be conceivable that detect a current opening state of the valve unit 20 and forward the corresponding information to a central control unit.

In the example shown, the valve piston 28 with all of its mentioned areas 28a to 28d is formed as one piece and made of a hard and resistant material such as stainless steel. Also, the valve block 22 is made of such a hard and resistant material such as stainless steel. However, also configurations are conceivable in which the valve piston 28 and/or the valve block 22 consist of several single elements that can be coupled to each other.

In the example shown, the entire shown hydraulic component 10 with all of its elements does not comprise any separate sealing element that could be configured in the form of a sealing ring consisting of a resilient material, for example. In this way, hysteresis effects that are regularly caused by such sealing elements when opening and closing the valve unit 20 can safely be avoided. Moreover, the performance of the obtained hydraulic component 10 over its lifetime changes only slightly, since it is completely refrained from sealing elements that are very susceptible to wear and have varying properties according to their wear. This results in a reliable and largely maintenance-free functionality of the hydraulic component 10 over its entire lifetime and enables a precise and reliable control of the hydraulic component 10 and its valve unit 20.

While in the present case the collecting unit 30 has a container 32 and an outlet 34 the collecting unit 30 can also directly be configured as part of a feedback line or a tank of the corresponding hydraulic system. In this way, the structure of the obtained hydraulic system would significantly be simplified and reduced in size.

Further, the draining unit 30 could also be configured such that one or both end openings 24a, 24c of the first bore 24 when operating the hydraulic system equipped with the hydraulic component 10 are oil-immersed.

By allowing the "leakage" from the valve unit 20 into the collecting unit 30 it is possible to protect the hydraulic component 10 and the corresponding hydraulic system against pressure peaks and, for example to permit a start of a hydraulic motor of the hydraulic system without torque.

Moreover, the costs for the accurately fitting adaption of the valve piston 28 to the first bore 24 as well as forces required to shift the operating state of the valve unit 20 can significantly be reduced, because the need to optimally suppress leakage between the valve piston 28 and the valve block 22 is void. So, it is possible to both save costs and significantly increase the response time of the valve unit 20.

What is claimed is:

1. A hydraulic component for a hydraulic system comprising:
   a valve unit pressurizable with hydraulic fluid, the valve unit including a valve block having a first bore, a valve piston moveably supported along the first bore, and a pressure line configured as a second bore, wherein the valve piston is movable between a closed position and an open position, and the first bore is a through-hole that extends through the entire valve block, with a first end opening and a second end opening, wherein the first bore has at least a first portion extending from the first end opening of the first bore toward the second end opening of the first bore, and a second portion extending from the second end opening of the first bore toward the first end opening of the first bore, wherein the second bore leads to the first or second portion of the first bore, wherein the valve piston has at least a sliding-contact area that is fittingly adapted to the second portion of the first bore, and that is configured to be moveable along the second portion of the first bore during a movement of the valve piston between the closed position and the open position of the valve piston, and wherein the second portion of the first bore and the sliding-contact area of the valve piston are configured without a seal; and
   a collecting unit that at least partially surrounds the first end opening and the second end opening of the first bore, the collecting unit being configured to receive and drain hydraulic fluid leaking out of the first end opening and the second end opening of the first bore.

2. The hydraulic component according to claim 1, wherein a first inner diameter in the first portion of the first bore is greater than a second inner diameter in the second portion of the first bore.

3. The hydraulic component according to claim 1, wherein the sliding-contact area of the valve piston has an outer diameter that is fittingly adapted to the second portion of the first bore so that the sliding-contact area is moveable along the second portion of the first bore during a movement of the valve piston between the closed position and the open position.

4. The hydraulic component according to claim 1, wherein the collecting unit has a container, the second bore has a pressure line port, and the valve unit is at least partially arranged within the container so that at least the pressure line port is outside of the container.

5. The hydraulic component according to claim 1, wherein the collecting unit is configured to collect and drain hydraulic fluid leaking out between an outer wall of the valve piston and an inner wall of the first bore.

6. The hydraulic component according to claim 1, wherein an axial length of the valve piston at least corresponds to an axial length of the first bore, and the valve piston has contact points for connecting functional elements at both of its axial ends.

7. The hydraulic component according to claim 6, wherein a functional element is provided at at least one of the contact points of the valve piston, wherein the functional element is configured to restrict a movement of the valve piston, to cause a movement of the valve piston, to bias the valve piston toward the closed position or toward the open position, and/or to determine a state of motion of the valve piston.

8. The hydraulic component according to claim 1 wherein the valve unit is configured as a seat valve, and the valve block in the area of one of the two end openings of the first bore has a valve seat.

9. A hydraulic system comprising the hydraulic component according to claim 1.

10. The hydraulic system according to claim 8 wherein the collecting unit is a tank of the hydraulic system.

11. A hydraulic component for a hydraulic system comprising:
a valve unit pressurizable with hydraulic fluid, the valve unit including a valve block having a first bore and a valve piston moveably supported along the first bore, wherein the valve piston is movable between a closed position and an open position, and the first bore is a through-hole that extends through the entire valve block, with a first end opening and a second end opening, and wherein an axial length of the valve piston at least corresponds to an axial length of the first bore, and the valve piston has contact points for connecting functional elements at both of its axial ends; and
a collecting unit that at least partially surrounds the first end opening and the second end opening of the first bore, the collecting unit being configured to receive and drain hydraulic fluid leaking out of the first end opening and the second end opening of the first bore.

12. The hydraulic component according to claim 11,
wherein the valve unit has a pressure line configured as a second bore,
wherein the first bore has at least a first portion extending from the first end opening of the first bore toward the second end opening of the first bore, and a second portion extending from the second end opening of the first bore toward the first end opening of the first bore,
and wherein the second bore leads to the first or second portion of the first bore.

13. The hydraulic component according to claim 12,
wherein a first inner diameter in the first portion of the first bore is greater than a second inner diameter in the second portion of the first bore.

14. The hydraulic component according to claim 12,
wherein the valve piston has at least a sliding-contact area that is fittingly adapted to the second portion of the first bore, and that is configured to be moveable along the second portion of the first bore during a movement of the valve piston between the closed position and the open position of the valve piston.

15. The hydraulic component according to claim 12,
wherein the valve piston includes a sliding-contact area having an outer diameter that is fittingly adapted to the second portion of the first bore so that the sliding-contact area is moveable along the second portion of the first bore during a movement of the valve piston between the closed position and the open position.

16. The hydraulic component according to claim 14,
wherein the second portion of the first bore and the sliding-contact area of the valve piston are configured without a seal.

17. The hydraulic component according to claim 12,
wherein the collecting unit has a container, the second bore has a pressure line port, and the valve unit is at least partially arranged within the container so that at least the pressure line port is outside of the container.

18. The hydraulic component according to claim 11,
wherein the collecting unit is configured to collect and drain hydraulic fluid leaking out between an outer wall of the valve piston and an inner wall of the first bore.

19. The hydraulic component according to claim 11,
wherein a functional element is provided at at least one of the contact points of the valve piston, wherein the functional element is configured to restrict a movement of the valve piston, to cause a movement of the valve piston, to bias the valve piston toward the closed position or toward the open position, and/or to determine a state of motion of the valve piston.

20. A hydraulic system comprising the hydraulic component according to claim 11.

* * * * *